UNITED STATES PATENT OFFICE.

GEORGE M. ALLERTON, OF NAUGATUCK, CONNECTICUT.

MANUFACTURE OF RUBBER BOOTS AND SHOES.

SPECIFICATION forming part of Letters Patent No. 225,091, dated March 2, 1880.

Application filed January 26, 1880.

*To all whom it may concern:*

Be it known that I, GEORGE M. ALLERTON, of Naugatuck, in the county of New Haven and State of Connecticut, have invented a new and useful Improvement in Manufacturing Rubber Boots and Shoes; and I do hereby declare that the following is a full, clear, and exact description of the invention, which will enable others skilled in the art to which it appertains to make and use the same.

Heretofore rubber boots and shoes have commonly been made by cutting the skeleton or lining out of fibrous or woolen material covered with a thin coating of rubber by the calender or spreader process into the proper shape and stretching it upon a last, so that its gum surface, while still moist, shall be on the outside; and then applying over the calendered cloth pieces of sheet-rubber, also cut into proper shape, the application being so made that the gum surfaces of the inner and outer parts will come into contact with one another and adhere, the edges being overlapped or formed into a seam before vulcanization or curing. Shoes so formed have these disadvantages, when compared with those manufactured by my improved process: they are liable to be imperfect at the seams, and they cannot be made so light and neat as the shoe manufactured by my improved process, owing to the two thicknesses of material from which they are formed. The shoes made according to the old process also involved much more labor and material and more waste.

My invention is to form a light and seamless shoe or other article by the process hereinafter described.

The first step of my improved process is similar to that of the method now in common use and above described, namely: The skeleton or lining made of fibrous or woolen material, covered with a thin coat of rubber by the calender or spreader process, is cut into proper shape and stretched smoothly upon a last, the inner sole being applied and the edges of the parts being united and strengthened by strips of cloth coated on both sides with gum.

The skeleton or foundation of the shoe, being now formed and strengthened as above described, is ready for the second step of my process. I thereupon immerse the said skeleton while still upon a last in a bath of rubber dissolved in naphtha or other solvent, thus covering the whole skeleton or foundation with an even seamless coating of rubber, which may be made as thin or as thick as required.

The thin coating of rubber first applied prevents the rubber in solution from striking through and injuring the lining. Any other soluble material may be used for rendering the lining impervious. The outsole and binding can then be applied in the usual way, and the rubber may be stamped or ornamented, as required. The shoe is then vulcanized or cured.

I thus do away with the exterior sheet of rubber used in the old process, and form a boot or shoe which is seamless, and which may be made considerably lighter while equally durable with those now in use.

Other articles of rubber may be made in the same way by making on a form the skeleton or lining out of fibrous material lightly coated with gum, and then immersing in the bath of rubber in solution.

By the use of appropriate machinery I am enabled to immerse many articles at one time, whereas by the old process each one was finished by hand.

Rubber articles can thus by this process be made much more rapidly and cheaply than heretofore.

I do not claim by itself the process of forming the skeleton or foundation of the shoe upon the last; nor do I broadly claim by itself the process of immersion in india-rubber in solution, the first rubber shoes and other articles imported into this country having been made by dipping molds of forms into liquid rubber, and when it had hardened stripping off the rubber from the form; nor do I claim the vulcanization or curing. All these processes, taken separately, are old; but That which I do claim, and desire to secure by Letters Patent, is—

The process of making seamless india-rubber boots or shoes or other articles by first forming the skeleton or lining in the required shape upon a last or form, the said skeleton being formed of fibrous material coated on one side with gum or its equivalent, then immersing the article while upon the last or form in a bath of india-rubber in solution, and then vulcanizing or curing, substantially as described.

GEO. M. ALLERTON.

Witnesses:
C. WYLLYS BETTS,
SAML. R. BETTS.